US009817812B2

(12) United States Patent
Novitskiy et al.

(10) Patent No.: US 9,817,812 B2
(45) Date of Patent: Nov. 14, 2017

(54) IDENTIFYING WORD COLLOCATIONS IN NATURAL LANGUAGE TEXTS

(71) Applicant: ABBYY InfoPoisk LLC, Moscow (RU)

(72) Inventors: Valery Novitskiy, Moscow (RU); Evgeny Indenbom, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 14/969,909

(22) Filed: Dec. 15, 2015

(65) Prior Publication Data

US 2017/0132205 A1    May 11, 2017

(30) Foreign Application Priority Data

Nov. 5, 2015 (RU) ................................ 2015147536

(51) Int. Cl.
*G06F 17/27* (2006.01)

(52) U.S. Cl.
CPC .......... *G06F 17/277* (2013.01); *G06F 17/271* (2013.01); *G06F 17/2785* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277
USPC .................................................. 704/1, 9, 10
See application file for complete search history.

(56) References Cited

U.S. PATENT DOCUMENTS

| | | | |
|---|---|---|---|
| 6,064,951 A * | 5/2000 | Park | G06F 17/30669 704/3 |
| 7,580,921 B2 | 8/2009 | Patterson et al. | |
| 8,117,223 B2 | 2/2012 | Patterson et al. | |
| 8,209,335 B2 | 6/2012 | Novak et al. | |
| 8,280,877 B2 | 10/2012 | Zhang et al. | |
| 8,402,033 B1 | 3/2013 | Przebinda et al. | |
| 8,423,349 B1 | 4/2013 | Huynh et al. | |
| 8,650,026 B2 | 2/2014 | Knodt et al. | |
| 8,781,817 B2 | 7/2014 | Thomas et al. | |
| 8,788,342 B2 | 7/2014 | Hu et al. | |
| 2002/0178005 A1 * | 11/2002 | Dusan | G06F 17/271 704/254 |

(Continued)

OTHER PUBLICATIONS

Novitskiy, Automatic retrieval of parallel collocations, 2011, International Conference on Pattern Recognition and Machine Intelligence, Springer, pp. 261-267.*

(Continued)

*Primary Examiner* — Lamont Spooner
(74) *Attorney, Agent, or Firm* — Lowenstein Sandler LLP

(57) ABSTRACT

Systems and methods for identifying word collocations in natural language texts. An example method comprises: performing, by a computing device, semantico-syntactic analysis of a natural language text to produce a plurality of semantic structures; generating, in view of relationships defined by the semantic structures, a raw list of word combinations; producing a list of collocations by applying a heuristic filter to the raw list of word combinations; and using the list of collocations to perform a natural language processing operation.

20 Claims, 15 Drawing Sheets

(56) References Cited

U.S. PATENT DOCUMENTS

| | | | | |
|---|---|---|---|---|
| 2004/0220813 | A1* | 11/2004 | Weng | G10L 15/183 704/277 |
| 2005/0108001 | A1* | 5/2005 | Aarskog | G06F 17/271 704/10 |
| 2005/0228641 | A1* | 10/2005 | Chelba | G06F 17/27 704/9 |
| 2006/0212294 | A1* | 9/2006 | Gorin | G10L 15/18 704/245 |
| 2006/0251338 | A1* | 11/2006 | Gokturk | G06F 17/30253 382/305 |
| 2006/0253491 | A1* | 11/2006 | Gokturk | G06F 17/30256 |
| 2007/0061128 | A1* | 3/2007 | Odom | G06F 19/325 704/4 |
| 2009/0182549 | A1* | 7/2009 | Anisimovich | G06F 17/2755 704/4 |
| 2011/0320187 | A1* | 12/2011 | Motik | G06F 17/278 704/9 |
| 2012/0303611 | A1* | 11/2012 | Kusumura | G06F 17/3071 707/722 |
| 2014/0156567 | A1* | 6/2014 | Scholtes | G06F 17/30 706/12 |
| 2014/0280173 | A1* | 9/2014 | Scholtes | G06F 17/30705 707/740 |
| 2015/0019541 | A1* | 1/2015 | Carus | G06F 17/3053 707/723 |
| 2015/0193428 | A1* | 7/2015 | Lim | G06F 17/2785 704/9 |
| 2015/0205860 | A1* | 7/2015 | Okura | G06F 17/30684 707/727 |
| 2015/0278195 | A1* | 10/2015 | Yang | G06F 17/2785 704/9 |
| 2016/0048587 | A1* | 2/2016 | Scholtes | G06F 17/30705 706/11 |
| 2016/0147878 | A1* | 5/2016 | Mana | G06F 17/30684 707/706 |
| 2016/0260026 | A1* | 9/2016 | Kloetzer | G06N 5/047 |

OTHER PUBLICATIONS

McEnery et al., Corpus linguistics, 2003, The Oxford Handbook of Computational Linguistics, pp. 1-4.*

Ustalov, "Terms extraction from Russian texts using graph models", Conference regarding 'Graphs theory and applications', 2012, 8 pages, Ural University Press, Ekaterinburg, Russia.

Pivovarova et al., "Extraction and classification of collocations of the terms using linguistic science texts (tentative observations)", Symposium regaring 'Terminology and knowledge', 2010, 13 pages, Russian State University for the Humanities Press, Moscow, Russia.

* cited by examiner

| This | boy | is | smart | , | he' | | succeed | in | life |
|---|---|---|---|---|---|---|---|---|---|
| this <Pronoun, GTNoun, PersonThird> | boy <Noun, Masc, Nominativ, GTNoun, Singular> | be <Verb, GTVerb, Singular, PersonThird, ZeroType, Present, Nonnegative, NoCompositeness> | smart <Adjective, DegreePositive, GTAdjectiveAttr, FullComparison> | | he <Pronoun, Nominative \| Accusative, GTNoun, Masculine, Singular, PersonThird, RCPersonal, Unreflexive> | shall <Verb, GTVerbModal, ZeroType, Present, Nonnegative, Composite_ll> | succeed <Verb, GTInfinitive, NumberZero, PersonZero, ZeroType, TenseZero, Nonnegative> | in <Adverb, GTAdverb> | life <Adjective, DegreePositive, GTAdjectiveAttr> |
| this <Invariable> | | be <Verb, GTVerb, Singular, PersonThird, ZeroType, Present, Nonnegative, Regular, Composite_for_t> | smart <Verb, GTVerb, Singular, PersonFirst \| PersonSecond, Present, Nonnegative, NoCompositeness> | | | will <Verb, GTVerbModal, ZeroType, Present, Nonnegative, Irregular, Composite_ll> | succeed <Verb, GTVerb, Singular, PersonFirst \| PersonSecond, ZeroType, Present, Nonnegative, NoCompositeness> | in <Preposition> | life <Noun, Nominative \| Accusative, GTNoun, Singular> |
| this <Pronoun, GTAdjectiveAttr, Singular, RCDemonstrative> | | | smart <Verb, GTVerb, Plural, ZeroType, Present, Nonnegative, NoCompositeness> | | | | succeed <Verb, GTInfinitive, NumberZero, PersonZero, ZeroType, TenseZero, Nonnegative> | | |
| | | | smart <Verb, GTInfinitive, NumberZero, PersonZero, ZeroType, TenseZero, Nonnegative> | | | | | | |
| | | | smart <Adverb, DegreePositive, GTAdverb, FullComparison> | | | | | | |
| | | | smart <Noun, Nominative \| Accusative, GTNoun, Singular> | | | | | | |

Fig. 5

IDENTIFYING WORD COLLOCATIONS IN NATURAL LANGUAGE TEXTS

CROSS REFERENCE TO RELATED APPLICATIONS

The present application claims the benefit of priority under 35 USC 119 to Russian patent application No. 2015147536, filed Nov. 5, 2015; the disclosure of which is incorporated herein by reference in its entirety.

TECHNICAL FIELD

The present disclosure is generally related to computer systems, and is more specifically related to systems and methods for natural language processing.

BACKGROUND

"Collocation" herein refers to a semantically and grammatically meaningful combination of two or more words that has, in a chosen text corpus, a frequency exceeding a certain threshold. "Collocation" herein refers to a representation of a collocation in which at least some words are represented by their respective semantic classes. Dictionaries of collocations and collocations may be employed by various natural language processing methods, such as information extraction and/or natural language translation methods.

SUMMARY OF THE DISCLOSURE

In accordance with one or more aspects of the present disclosure, an example method may comprise: performing, by a computing device, semantico-syntactic analysis of a natural language text to produce a plurality of semantic structures; generating, in view of relationships defined by the semantic structures, a raw list of word combinations; producing a list of collocations by applying a heuristic filter to the raw list of word combinations; and using the list of collocations to perform a natural language processing operation.

In accordance with one or more aspects of the present disclosure, an example system may comprise: a memory; a processor, coupled to the memory, the processor configured to: perform semantico-syntactic analysis of a natural language text to produce a plurality of semantic structures; generate, in view of relationships defined by the semantic structures, a raw list of word combinations; produce a list of collocations by applying a heuristic filter to the raw list of word combinations; and use the list of collocations to perform a natural language processing operation.

In accordance with one or more aspects of the present disclosure, an example computer-readable non-transitory storage medium may comprise executable instructions that, when executed by a computing device, cause the computing device to perform operations comprising: performing semantico-syntactic analysis of a natural language text to produce a plurality of semantic structures; generating, in view of relationships defined by the semantic structures, a raw list of word combinations; producing a list of collocations by applying a heuristic filter to the raw list of word combinations; and using the list of collocations to perform a natural language processing operation.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 schematically illustrates an example of a lexico-morphological structure of a sentence, in accordance with one or more aspects of the present disclosure;

DETAILED DESCRIPTION

Described herein are methods and systems for identifying word collocations in natural language texts. "Collocation" herein refers to a semantically and grammatically meaningful combination of two or more words (or their respective semantic or grammatical classes) that has, in a chosen text corpus, a frequency exceeding a certain threshold. Dictionaries of collocations and collocations may be employed by various natural language processing methods, such as information extraction and/or natural language translation methods. In certain implementations, automated translation methods may utilize a dictionary of parallel collocations (collocations), where a parallel collocation (collocation) refers to a combination two or more collocations (collocations) expressed in two or more natural languages having same or similar meanings in the respective natural languages.

While analyzing a text corpus to produce a list of word combinations having a frequency exceeding a certain threshold appears to be a straightforward, if not trivial, task, such a list would necessarily include a significant number of "false positives," such as high-frequency semantically and/or grammatically meaningless word combinations.

Aspects of the present disclosure address the above noted and other deficiencies by providing systems and methods for identifying word collocations in natural language texts. Systems and methods operating in accordance with one or more aspects of the present disclosure are enhanced by various heuristic filters designed to detect semantically and/or grammatically meaningless word combinations.

Various aspects of the above referenced methods and systems are described in details herein below by way of examples, rather than by way of limitation.

"Computing device" herein shall refer to a data processing device having a general purpose processor, a memory, and at least one communication interface. Examples of computing devices that may employ the methods described herein include, without limitation, desktop computers, notebook computers, tablet computers, and smart phones.

Figure 1:
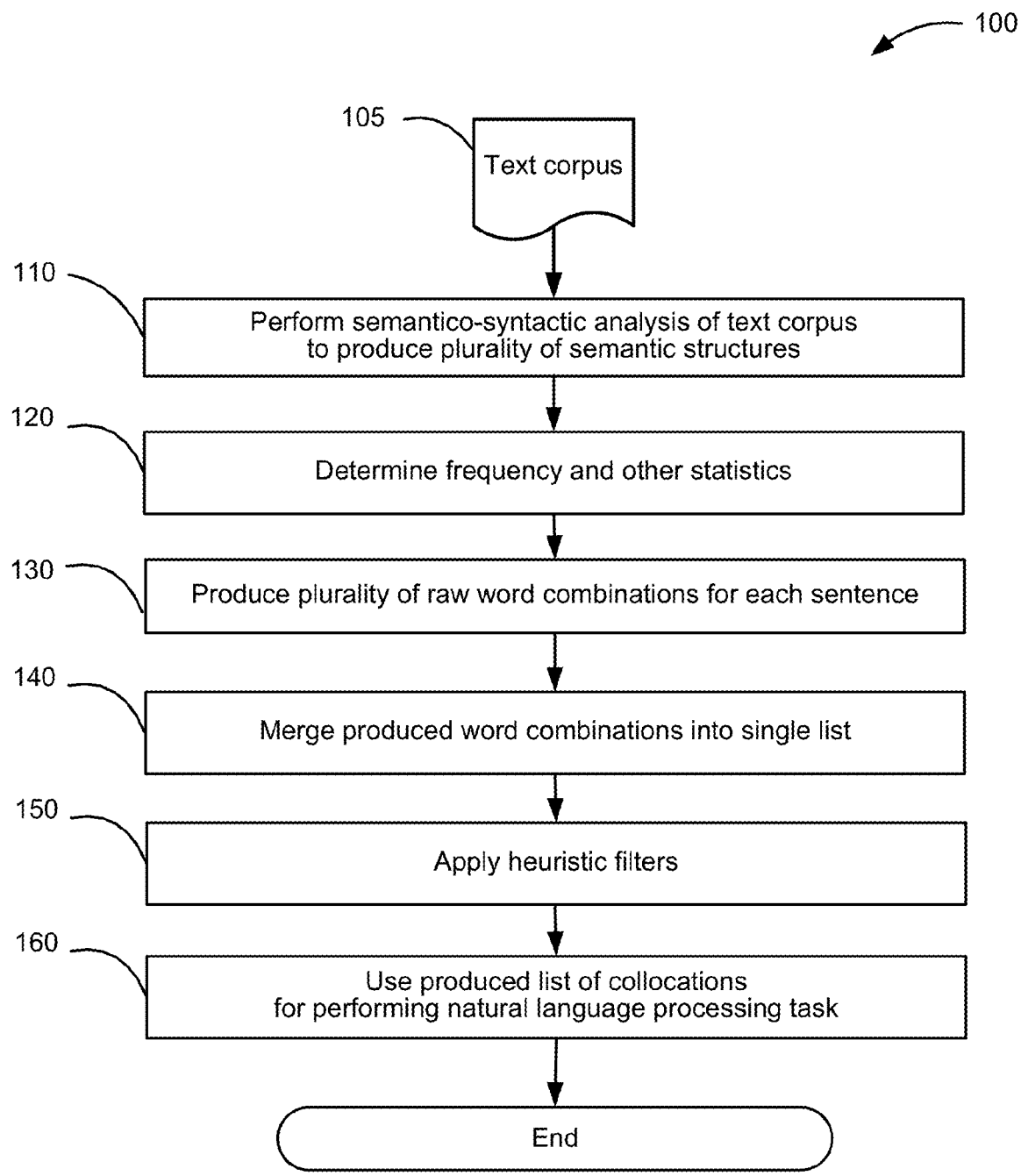
FIG. 1 depicts a flow diagram of an example method for identifying word collocations in natural language texts, in accordance with one or more aspects of the present disclosure.
Figure 15:
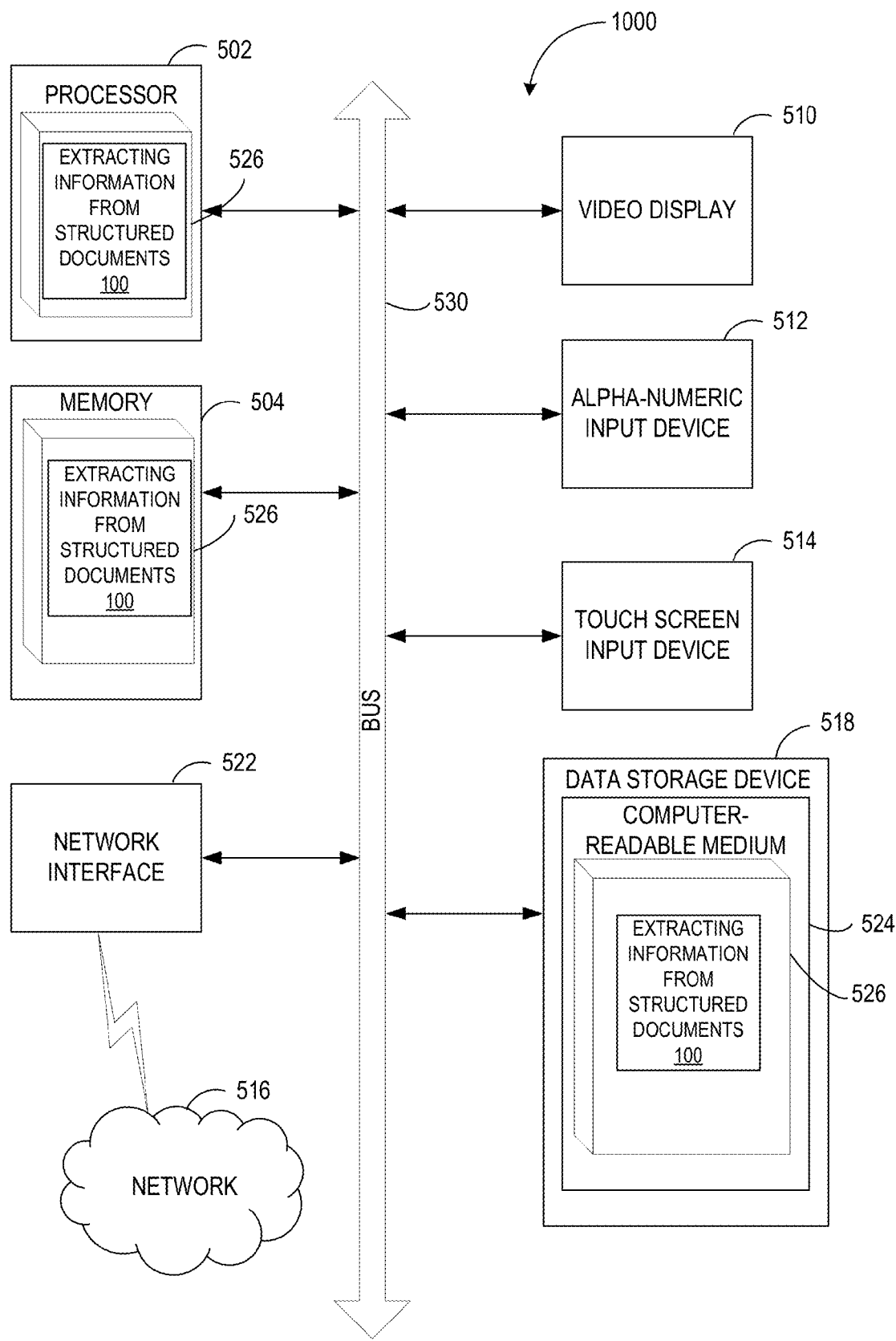
FIG. 15 depicts a diagram of an example computing device implementing the methods described herein.

FIG. 1 depicts a flow diagram of an illustrative example of a method 100 for identifying word collocations in natural language texts, in accordance with one or more aspects of the present disclosure. Method 100 and/or each of its individual functions, routines, subroutines, or operations may be performed by one or more processors of the computing device (e.g., computing device 1000 of FIG. 15) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other.

Figure 11:
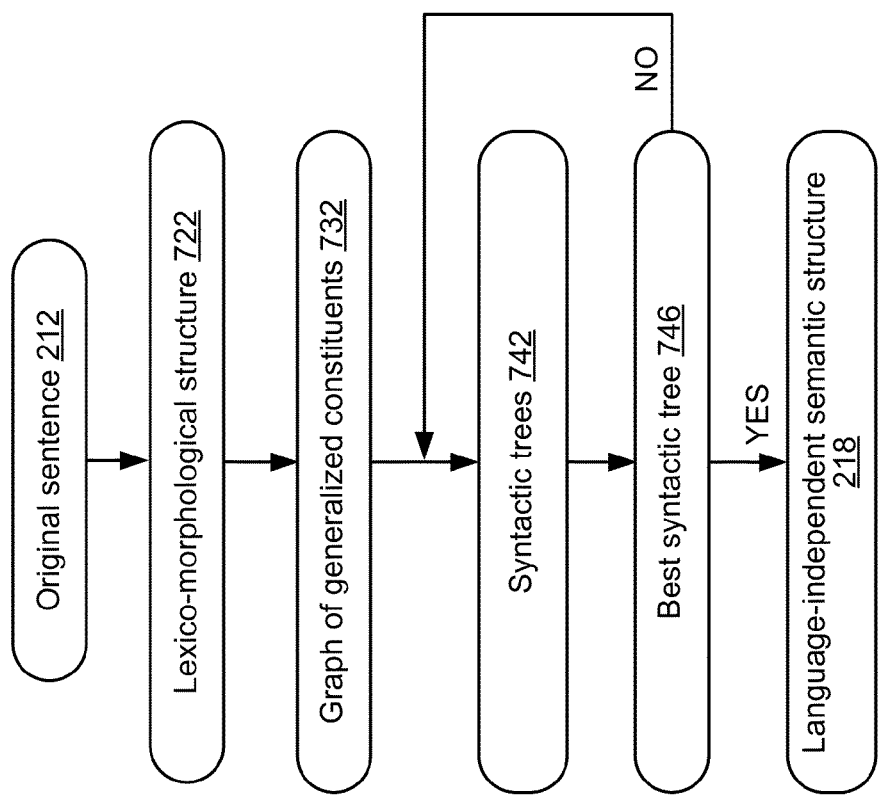
FIG. 11 schematically illustrates example data structures that may be employed by one or more methods implemented in accordance with one or more aspects of the present disclosure.
Figure 12:
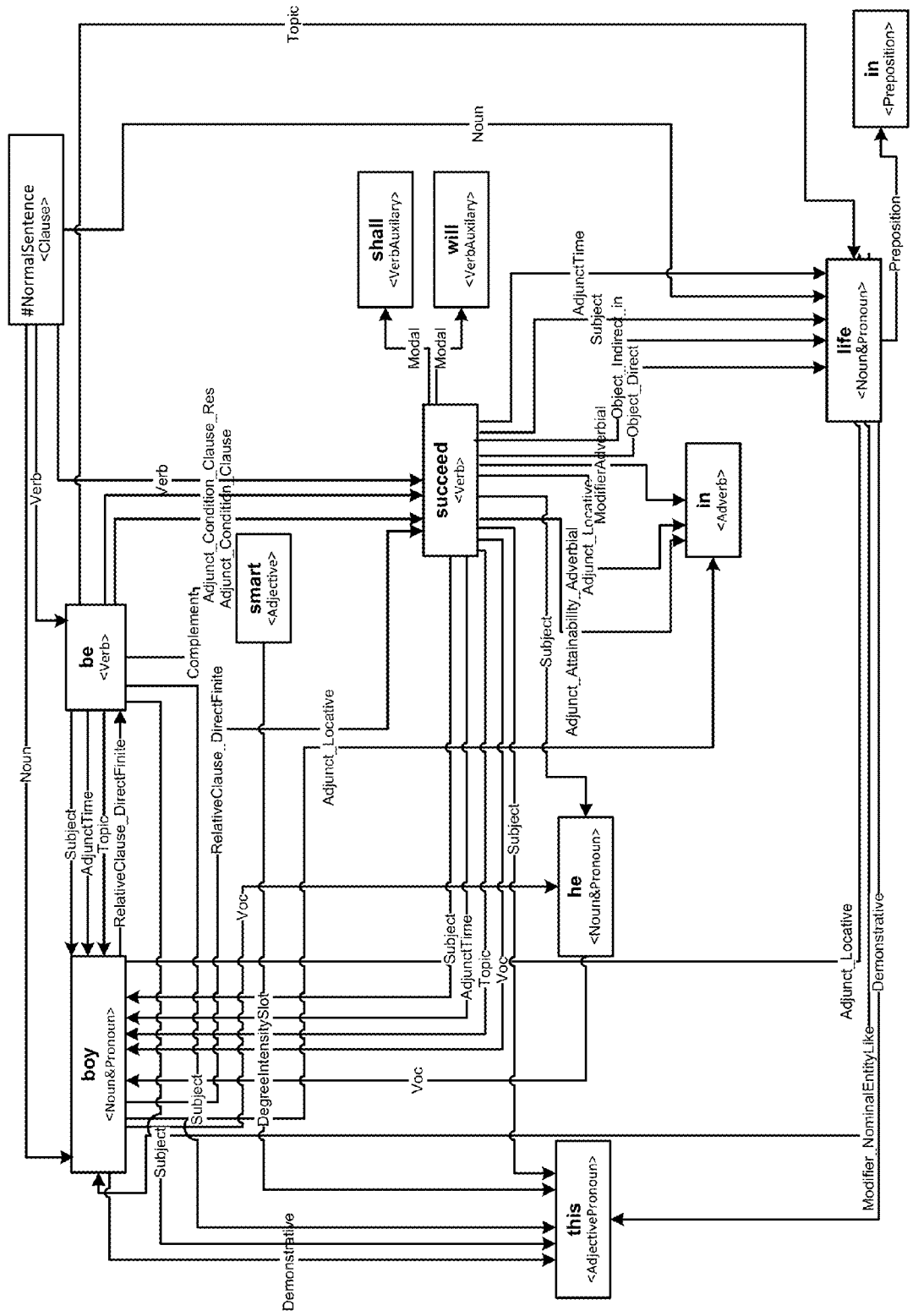
FIG. 12 schematically illustrates an example graph of generalized constituents, in accordance with one or more aspects of the present disclosure.
Figure 13:
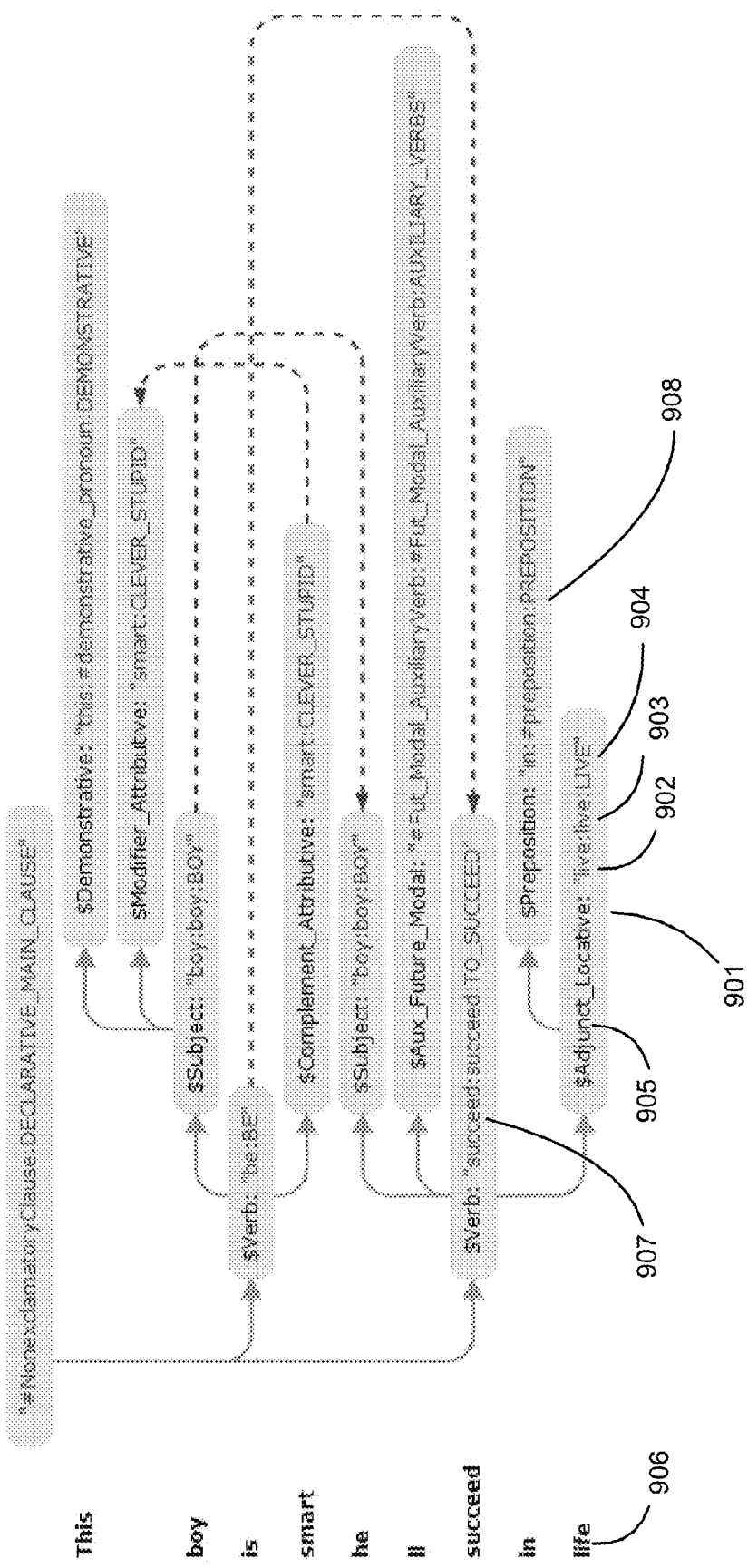
FIG. 13 illustrates an example syntactic structure corresponding to the sentence illustrated by FIG. 12.
Figure 14:
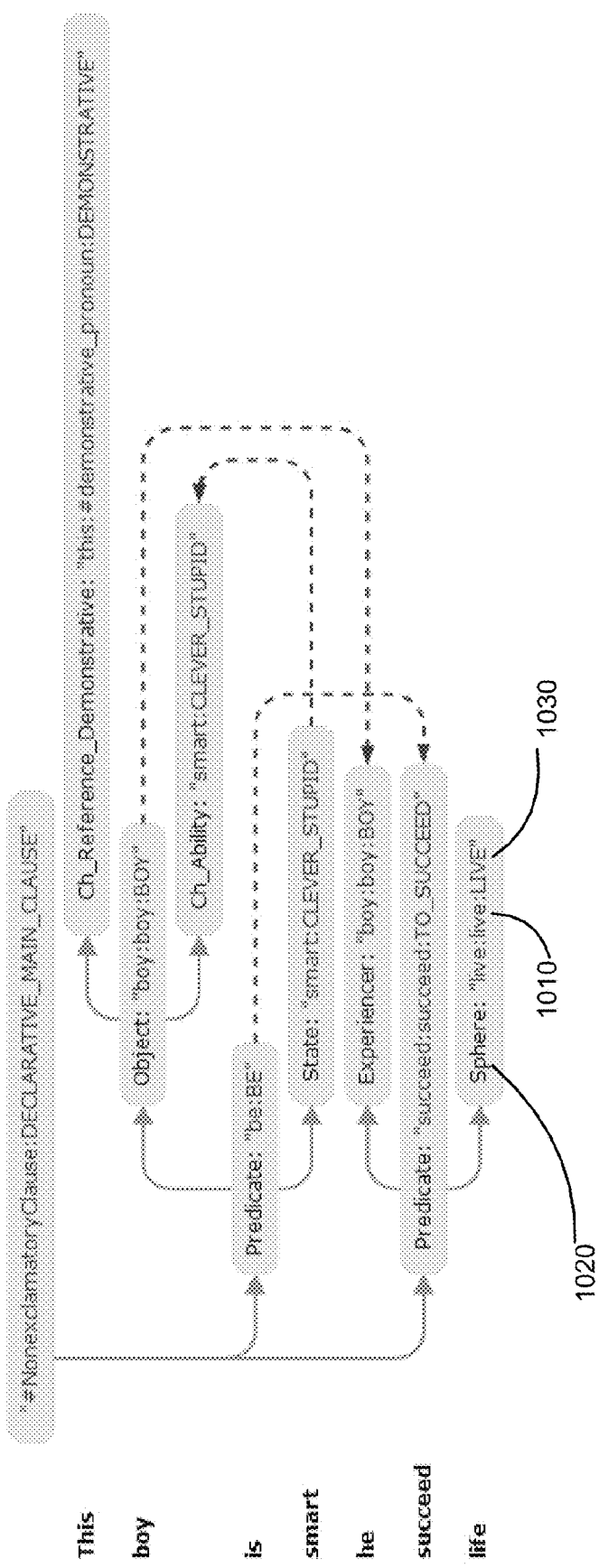
FIG. 14 illustrates a semantic structure corresponding to the syntactic structure of FIG. 13.

At block 110, a computing device implementing the method may perform syntactic and semantic analysis of a plurality of natural language sentences comprises by the input text corpus 105. The syntactic and sematic analysis may yield one or more semantic structures representing each natural language sentence. In certain implementations, the processing device may select, among a plurality of semantic structures produced by the syntactic and sematic analysis, a semantic structure that has the best value of a certain pre-defined rating, as described in more details herein below with references to FIG. 11.

At block 120, the computing device may determine various statistics associated with semantic structures produced by the syntactic and semantic analysis. Such statistics may include frequencies of occurrence, within the text corpus, of various combinations of semantic classes identified by the analysis, number of documents that contain each identified combination, etc. In certain implementations, combinations of certain number of elements (e.g., three semantic classes) may only be considered.

At block 130, the computing device may produce, for every sentence of the source text, a "raw" list of word combinations, such that each combination would include two or more words that are grammatically and/or semantically related, as described in more details herein below. Generating a list of "raw" word combinations is described in more details herein below with references to FIG. 2.

At block 140, the computing device may merge, into a single list, a plurality of word combination lists that have been produced for the plurality of sentences of the source text corpus. The merging process may involve discarding duplicates and determining each combination frequency and/or certain other statistics, as schematically shown by block 150 and described in more details herein below.

At block 160, the computing device may apply one or more heuristic filters to the resulting list of word combinations, in order to remove semantically and/or grammatically meaningless word combinations from the list, as described in more details herein below. In certain implementations, the resulting list may be converted to a desired format (e.g., a format that is compliant with the target application). Applying the heuristic filters is described in more details herein below with references to FIG. 3.

At block 170, the computing device may utilize the produced list of collocations for performing various natural language processing tasks. In an illustrative example, the list of word collocations may be used as the base for compiling a list of parallel collocations to be employed by an automated natural language translation process.

Certain operations of method 100 are described herein below in more details with reference to FIGS. 2-14.

Figure 2:
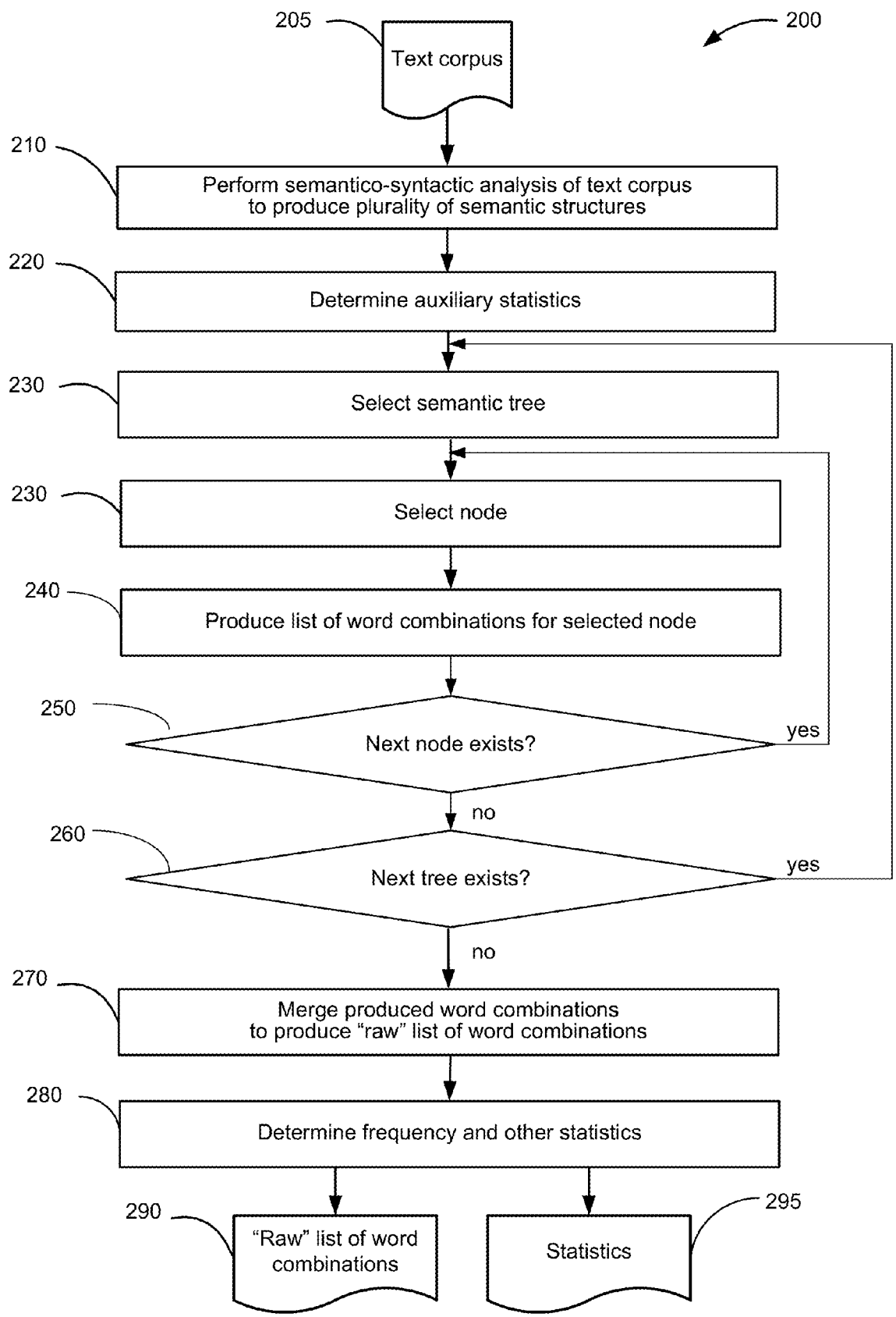
FIG. 2 depicts a flow diagram of an example method for generating a "raw" list of word combinations for a given text corpus, in accordance with one or more aspects of the present disclosure.

FIG. 2 depicts a flow diagram of an illustrative example of a method 200 for generating a "raw" list of word combinations for a given text corpus, in accordance with one or more aspects of the present disclosure. In certain implementations, method 200 may be employed for performing operations described herein above with reference to block 130 of FIG. 1. Method 200 and/or each of its individual functions, routines, subroutines, or operations may be performed by one or more processors of the computing device (e.g., computing device 1000 of FIG. 15) implementing the method. In certain implementations, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a computing device implementing the method may perform syntactic and semantic analysis of a plurality of natural language sentences comprises by the input text corpus 205. The syntactic and sematic analysis may yield one or more semantic structures representing each natural language sentence. In an illustrative example, such semantic structures may be represented by trees. In certain implementations, the processing device may select, among a plurality of semantic structures produced by the syntactic and sematic analysis, a semantic structure that has the best value of a certain pre-defined rating, as described in more details herein below with references to FIG. 11.

At block 220, the computing device may determine various auxiliary statistics for the chosen text corpus. In certain implementations, the computing device may calculate, for each sentence, its frequency of occurrence in the text corpus, in order to detect repeating text fragments (such as standard document preamble for a certain type of documents). The resulting frequency of occurrence of a word collocation detected within a repeated text fragment may be reduced by a number reflecting the frequency of the repeated text fragment itself, in order to counterweight the impact of such repeating text fragments onto the final list of word collocations.

Additionally or alternatively, the computing device may determine, for each sentence, groups of semantic classes that are related to each other by the respective semantic structures. In certain implementations, relationships of certain types (such as syntactic relationships) may only be considered. Alternatively or additionally, groups of a certain number of elements (e.g., three semantic classes) may only be considered. For each group of semantic classes, its frequency of occurrence in the text corpus may be determined. Low-frequency groups of semantic classes (i.e., groups having the frequency below a certain group frequency threshold) may be utilized by the subsequent method steps for discarding low-frequency word combinations. In an illustrative example, any word combination that contains a low-frequency group of semantic classes may be discarded.

At blocks 230-260, the computing device may traverse each semantic tree of the plurality of semantic trees that has been generated for the text corpus. In certain implementations, each semantic tree may be traversed in the upwards direction, i.e., from the terminal nodes (also referred to as "leaves") to the root.

For each node of the semantic tree, the computing device may, at block 240, produce a list of word combinations that contain the words corresponding to the child nodes of the current node. Also, the word combinations that have previously been produced for the child nodes may be appended to the list of word combinations corresponding to the current node.

In certain implementations, various constraints to the word combination size and/or structure may be applied in order to reduce the number of word combinations produced. In an illustrative example, the size of the word combinations may be limited by a certain number of words (e.g., five words). In another illustrative example, the size of a gap in the linear order of words that are contained by a word combination may be limited by a certain number of words.

At block 270, the computing device may merge, into a single list, a plurality of word combination lists that have been produced for the plurality of sentences of the source text corpus. The merging process may involve discarding duplicates and determining each combination frequency and/or certain other statistics, as schematically illustrated by block 280. In various illustrative examples, such statistics may, for each word combination, include: the number of occurrences of the word combination in the text corpus, both including and excluding the occurrences in the detected repeating text fragments; number of documents that contain the word combination; and/or number of different semantic trees corresponding to the word combination.

Responsive to completing operations described herein with references to block 240, the method may terminate. Outputs of method 200 may include the "raw" list 290 of word combinations associated with various statistic values 295.

Figure 3:
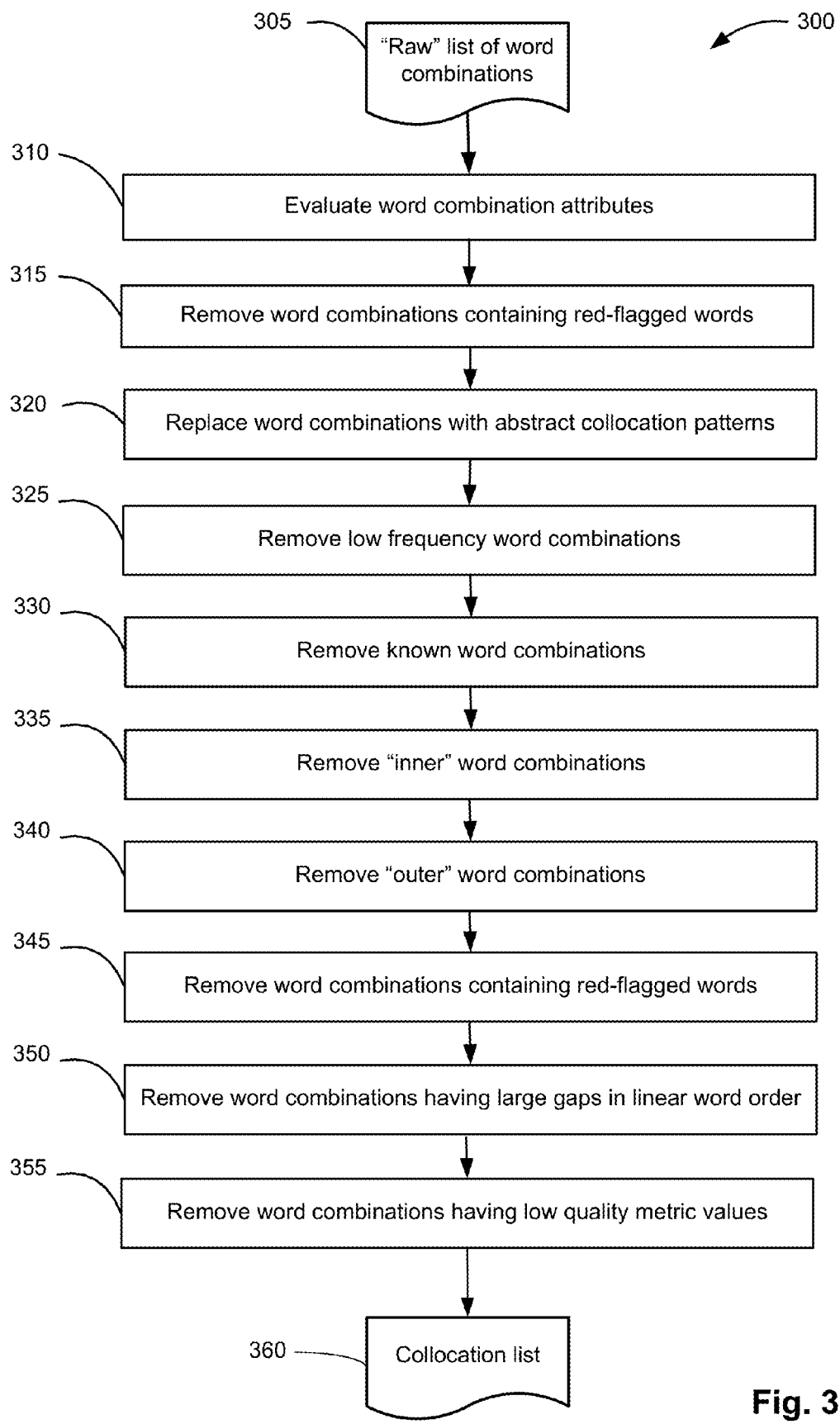
FIG. 3 depicts a flow diagram of an example method for applying one or more heuristic filters to a list of word combinations, in accordance with one or more aspects of the present disclosure.

FIG. 3 depicts a flow diagram of an illustrative example of a method 300 for applying one or more heuristic filters to the list of word combinations produced by method 200 described herein above, in accordance with one or more aspects of the present disclosure. In certain implementations, method 300 may be employed for performing operations described herein above with reference to block 160 of FIG. 1. Method 300 and/or each of its individual functions, routines, subroutines, or operations may be performed by one or more processors of the computing device (e.g., computing device 1000 of FIG. 15) implementing the method. In certain implementations, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

Method 300 includes several filtering operations. Each of the filtering operations takes the word combination list produced by the previous filtering operation and removes from the list the word combinations that match the filter parameters. In certain implementations, one or more filters may inspect not only individual word combinations and their respective statistics from the input list, but also groups of word combinations in the input list, thus the order of performing the filtering operations may affect the results produced by the method.

At block 310, a computing device implementing the method may evaluate certain attributes of the word combinations 305 received as the method input. In an illustrative example, if some occurrences of a word combination include capitalized letters while other occurrences include only lower case symbols, the capitalization attribute may be removed from all occurrences of the word combination. In another illustrative example, if the root of the syntactic sub-tree corresponding to a given word combination is predominantly associated to the remainder of the syntactic tree by a relationship of a particular type, occurrences of the given word combination that have a different root relationship type may be discarded. In yet another illustrative example, word combinations containing words having ambiguous grammatical characteristics may be discarded.

At block 315, the computing device may remove, from the list produced by the previous filtering operation, word combinations associated with "red-flagged" words, grammatical categories, and/or syntactic relationships. In an illustrative example, the computing device may remove, from the list produced by the previous filtering operation, word combinations containing words referenced by a first list defining "red-flagged words" in any position of the word combination. In another illustrative example, the computing device may remove, from the list produced by the previous filtering operation, word combinations containing words referenced by a second list defining "red-flagged words" in the root position of the word combination. In yet another illustrative example, the computing device may remove, from the list produced by the previous filtering operation, word combinations containing words of certain red-flagged categories, such as numerals, pronouns, etc. In yet another illustrative example, the computing device may remove, from the list produced by the previous filtering operation, word combinations containing relationships referenced by a third list defining "red-flagged" word relationships. In yet another illustrative example, the computing device may remove, from the list produced by the previous filtering operation, word combinations containing relationships referenced by a fourth list defining "red-flagged" word relationships for two-word collocations.

At block 320, the computing device may replace certain word combinations in the list produced by the previous filtering operation with their respective abstract collocations. In an illustrative example, the word combinations "city of Moscow," "city of New York," and "City of Paris" may be replaced with their abstract collocation "city CITY_BY_NAME." An abstract collocation may include one or more words (such as "city" in the above example) and/or one or more semantic class definitions (such as CITY_BY_NAME in the above example). If the abstract colocation is then used for analyzing an arbitrary text, all word combinations that have the same elements occurring in the same order would be regarded as matching the collocation. The semantic class definitions to be employed in producing the collocations may be defined using a pre-defined semantic class hierarchy, thus preventing inclusion into the list of abstract versions of certain specific word combinations (so that, e.g., "George Washington Bridge" would not be abstracted to "FORMER_PRESIDENT_BY_NAME bridge").

At block 325, the computing device may remove, from the list produced by the previous filtering operation, low-frequency word combinations. In an illustrative example, the computing device may remove, from the list produced by the previous filtering operation, word combinations having the frequency of occurrence within the text corpus falling below a certain low frequency threshold. In an illustrative example, the computing device may remove, from the list produced by the previous filtering operation, word combinations, for which the number of documents of the text corpus that contain such word combinations falls below a certain low document number threshold.

At block 330, the computing device may remove, from the list produced by the previous filtering operation, word combinations that are contained in a dictionary of known word combinations, to ensure that the method only produces new word combinations.

At block 335, the computing device may remove, from the list produced by the previous filtering operation, word combinations that are fully contained in other known word combinations (e.g., the word combination "Nobel Peace" is fully contained in the word combination "Nobel Peace Prize," and hence the former word combination will be removed from the list). In certain implementations, the computing device may compare the frequencies of both super-combination and sub-combination, and remove the sub-combination if the difference of the two frequencies falls below a certain frequency difference threshold.

At block 340, the computing device may remove, from the list produced by the previous filtering operation, word combinations that fully contain other known word combinations (e.g., the word combination "UN General Assembly resolution" fully contains the word combination "UN General Assembly," and hence the former word combination will be removed from the list).

At block 345, the computing device may repeat, with a different set of filtering parameters, removal of word combinations containing words associated with various lists of "red-flagged" words, grammatical categories, and syntactic relationships, similar to the filtering operation described herein above with reference to block 315.

At block 350, the computing device may remove, from the list produced by the previous filtering operation, word combinations that have gaps exceeding a certain threshold size in the linear order of words.

At block 355, the computing device may determine remove, from the list produced by the previous filtering operation, word combinations that have values of a certain quality metric falling below a certain pre-defined quality value threshold. In an illustrative example, the quality metric may be represented by the difference between the actual frequency and expected frequency for a given word combination. The expected frequency may be determined as the product of frequencies, within the plurality of semantic structures associated with the text corpus, of the semantic classes representing individual words of the word combination and frequencies of the relationships between the words of the word combination.

The list produced by the heuristic filer at block 355 may be converted to a desired format (e.g., a format that is compliant with the target application) to output the resulting collocation list 360.

Figure 4:
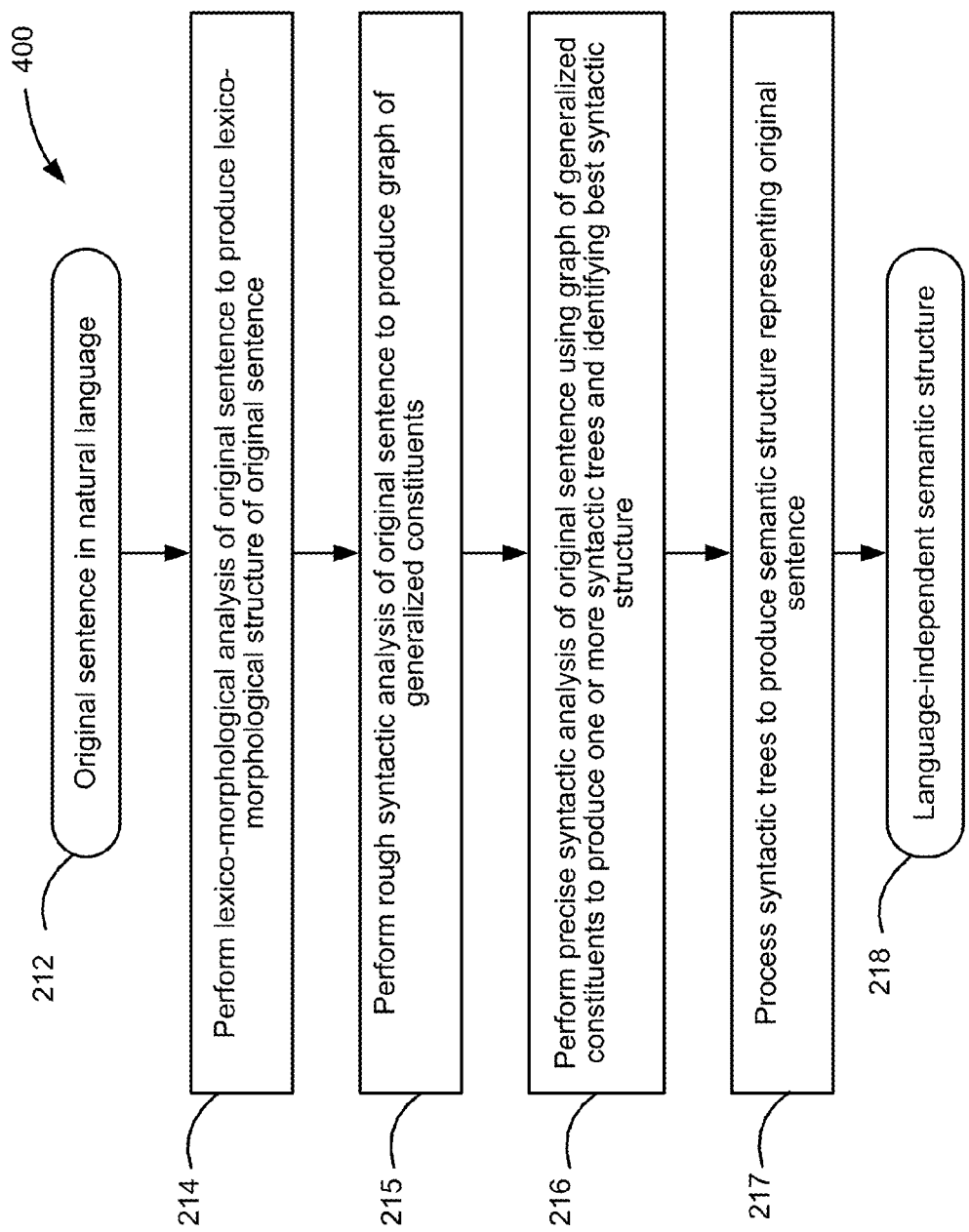
FIG. 4 depicts a flow diagram of one illustrative example of a method 400 for performing a semantico-syntactic analysis of a natural language sentence, in accordance with one or more aspects of the present disclosure.
Figure 6:
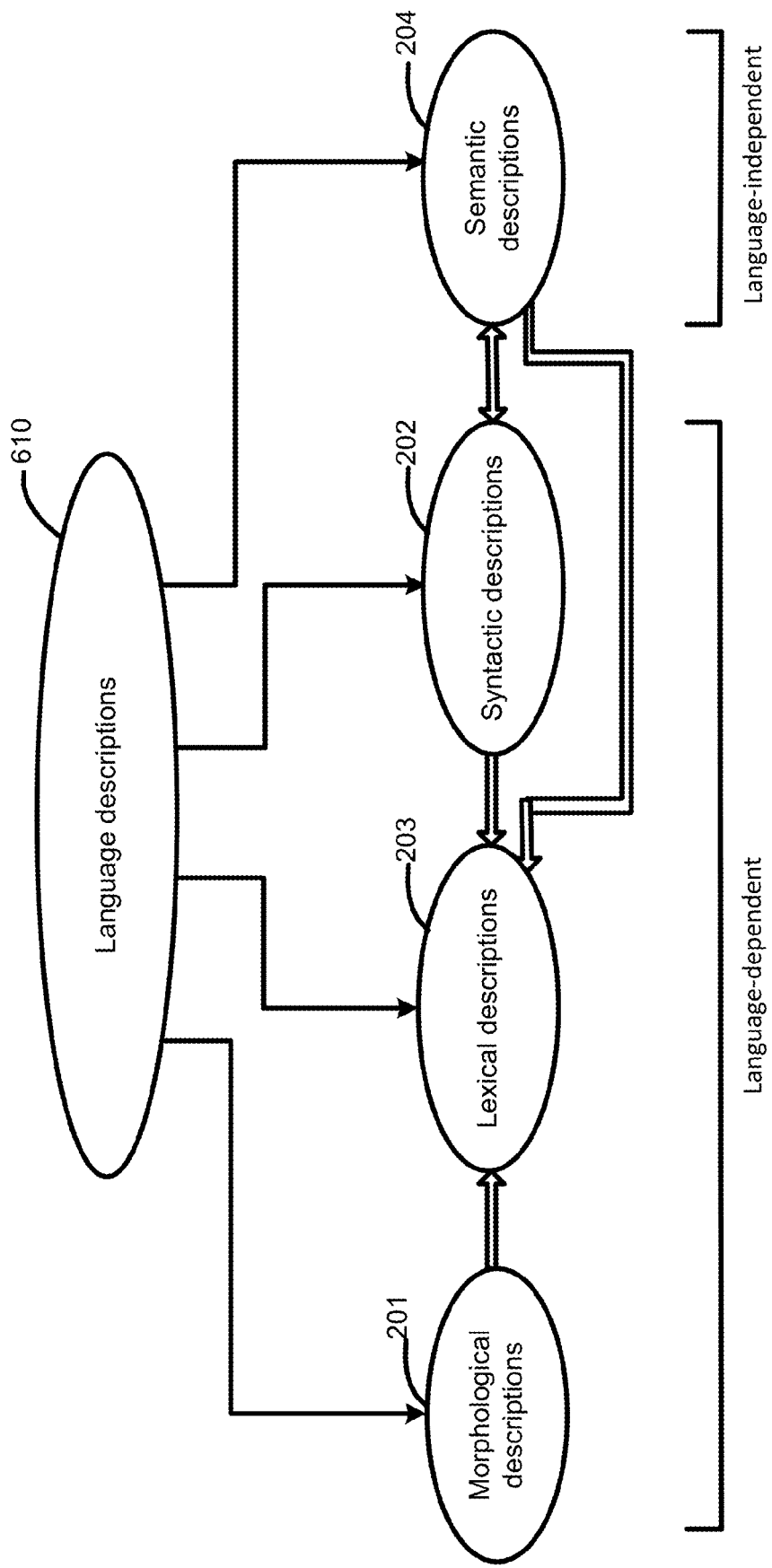
FIG. 6 schematically illustrates language descriptions representing a model of a natural language, in accordance with one or more aspects of the present disclosure.
Figure 7:
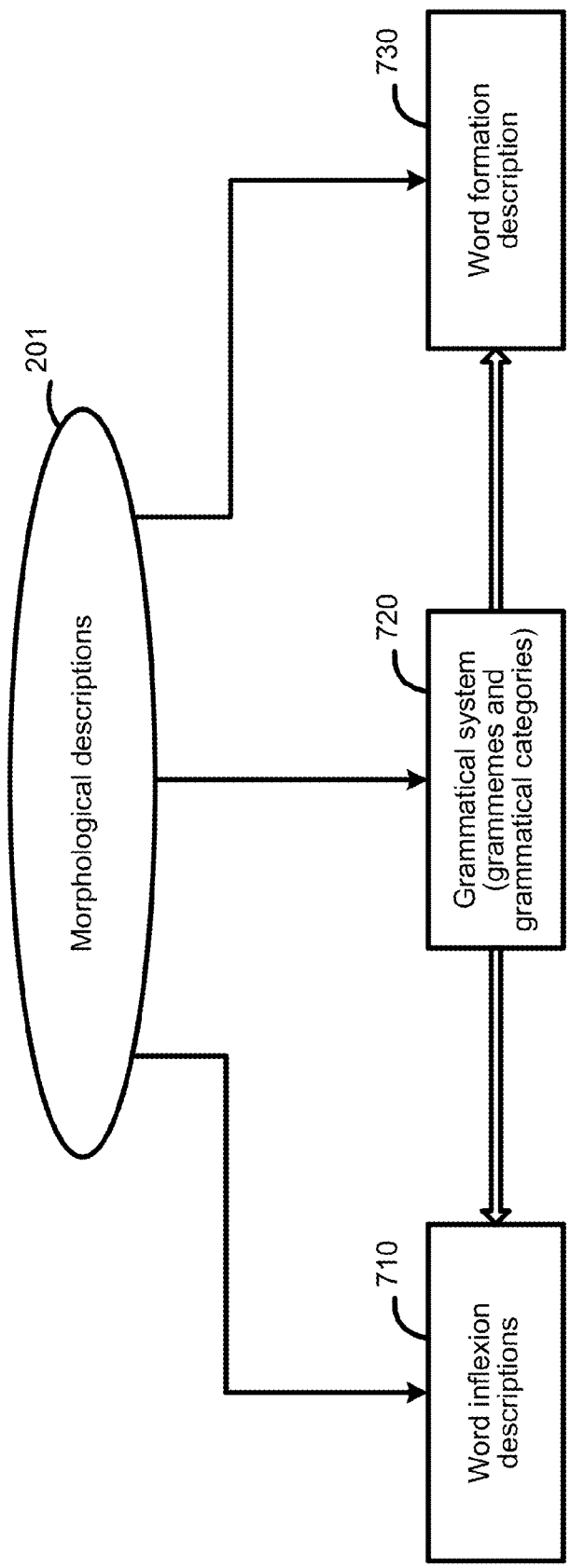
FIG. 7 schematically illustrates examples of morphological descriptions, in accordance with one or more aspects of the present disclosure.
Figure 8:
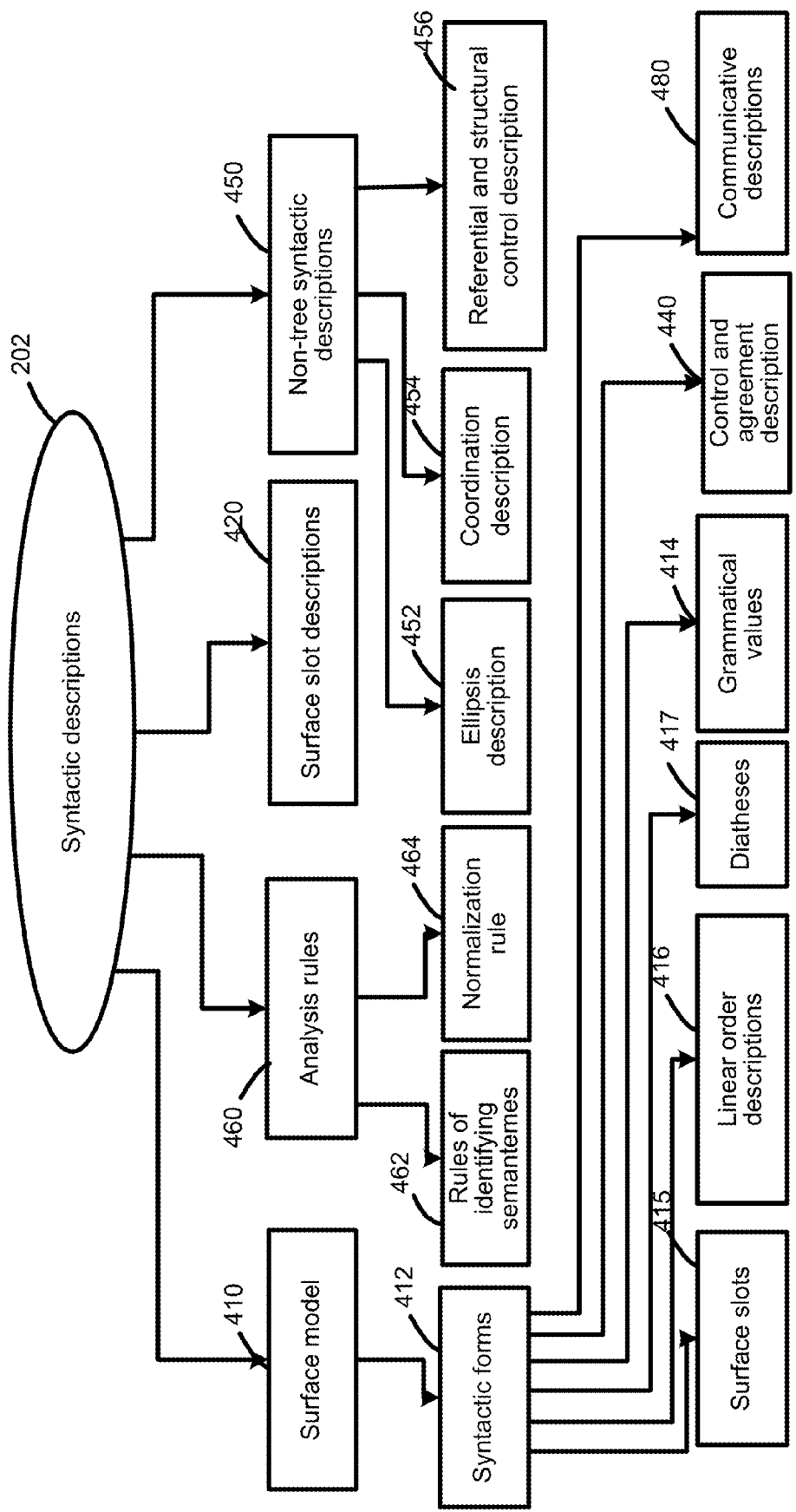
FIG. 8 schematically illustrates examples of syntactic descriptions, in accordance with one or more aspects of the present disclosure.
Figure 9:
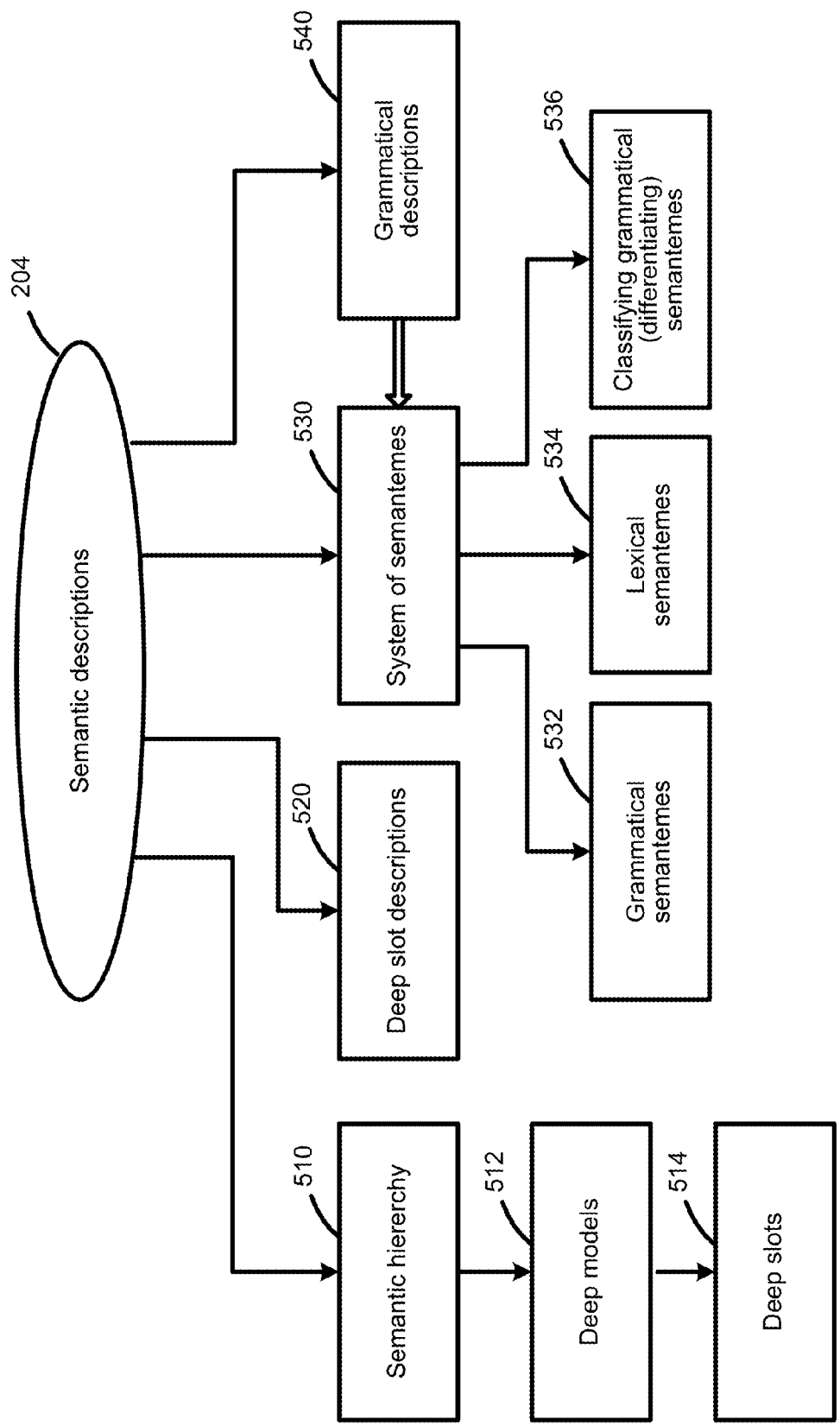
FIG. 9 schematically illustrates examples of semantic descriptions, in accordance with one or more aspects of the present disclosure.
Figure 10:
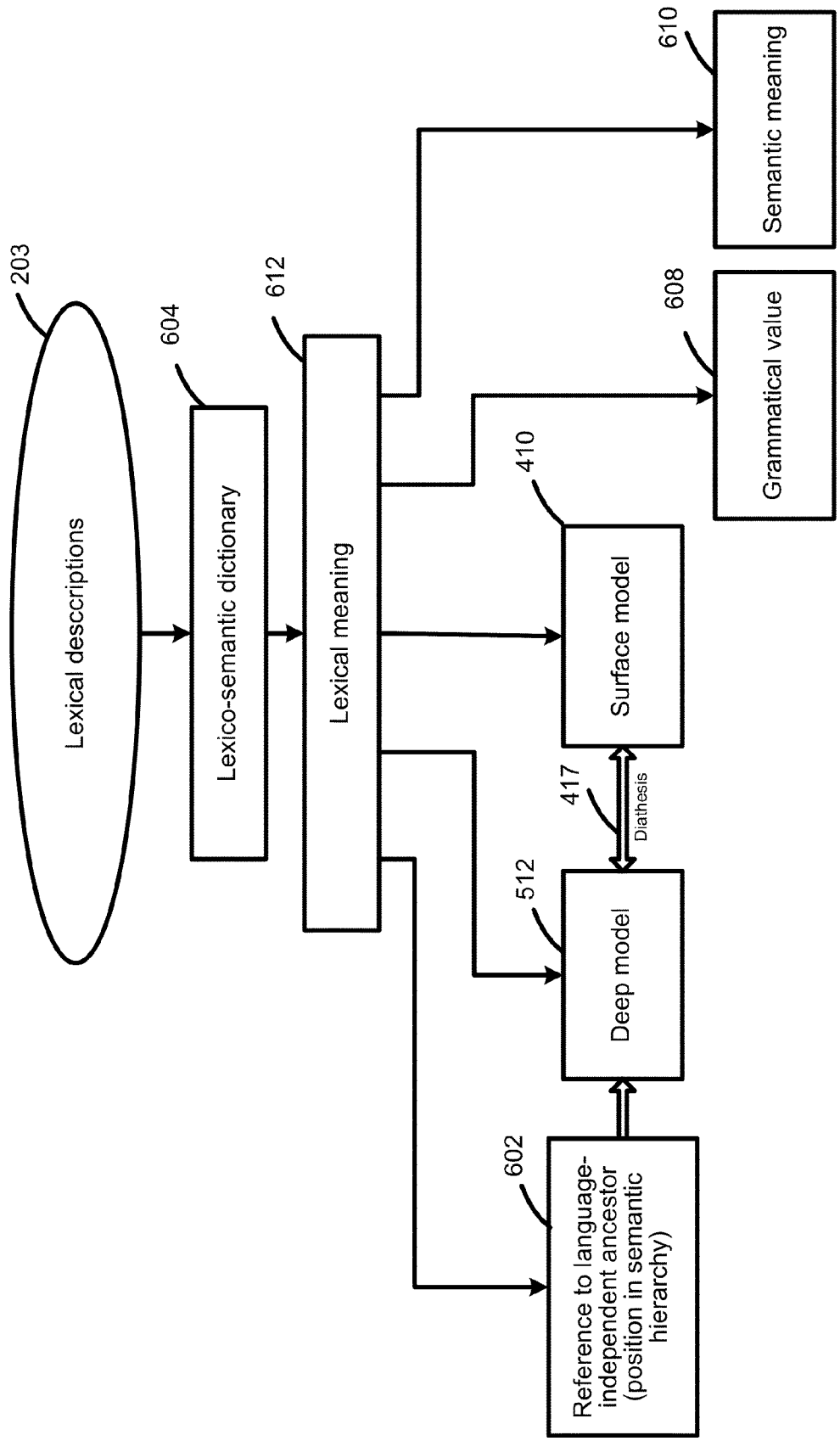
FIG. 10 schematically illustrates examples of lexical descriptions, in accordance with one or more aspects of the present disclosure.

FIG. 4 depicts a flow diagram of one illustrative example of a method 400 for performing a semantico-syntactic analysis of a natural language sentence 412, in accordance with one or more aspects of the present disclosure. Method 400 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 400 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

In accordance with one or more aspects of the present disclosure, the computing device implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more details herein. The index may be employed in various natural language processing tasks, including the task of performing semantic search.

The computing device implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computing device implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computing device implementing the methods described herein may also store and index the syntactic and semantic structures produced by one or more text analysis methods described herein, for employing those structures and/or indexes in semantic search, classification, clustering, and document filtering.

What is claimed is:

1. A method, comprising:
performing, by a computing device, semantico-syntactic analysis of a natural language text to produce a plurality of semantic structures;
generating, in view of relationships defined by the semantic structures, a raw list of word combinations;
determining an expected frequency of a word combination as a product of frequencies, within the plurality of semantic structures, of semantic classes representing individual words of the word combination and frequencies of relationships between words comprised by the word combination;
responsive to determining that a quality metric represented by a difference between an actual frequency and the expected frequency of the word combination falls below a quality metric threshold, removing the word combination from the raw list of word combinations to produce a list of collocations; and
using the list of collocations to perform a natural language processing operation.

2. The method of claim 1, wherein generating the raw list of word combinations comprises traversing a semantic structure of the plurality of semantic structures.

3. The method of claim 1, wherein generating the raw list of word combinations comprises determining values of a pre-defined statistic for each word combination comprised by the raw list of word combinations.

4. The method of claim 1, wherein producing the list of collocations further comprises evaluating an attribute of each word combination comprised by the raw list of word combinations.

5. The method of claim 1, wherein producing the list of collocations further comprises removing a word combination associated with a red-flagged word.

6. The method of claim 1, wherein producing the list of collocations further comprises replacing a word combination with a corresponding abstract collocation pattern.

7. The method of claim 1, wherein producing the list of collocations further comprises removing a word combination that is contained by another word combination referenced by the raw list of word combinations.

8. The method of claim 1, wherein producing the list of collocations further comprises removing a word combination that contains another word combination referenced by the raw list of word combinations.

9. The method of claim 1, wherein producing the list of collocations further comprises removing a word combination having a distance between words in a linear word order that exceeds a maximum distance threshold.

10. A system, comprising:
a memory;
a processor, coupled to the memory, the processor configured to:
perform semantico-syntactic analysis of a natural language text to produce a plurality of semantic structures;
generate, in view of relationships defined by the semantic structures, a raw list of word combinations;
produce a list of collocations by applying a heuristic filter to the raw list of word combinations, wherein applying the heuristic filter comprises removing a word combination having a quality metric value falling below a quality metric threshold, wherein the quality metric is represented by a difference between an actual frequency and an expected frequency of the word combination, and wherein the expected frequency of a word combination is determined as a product of frequencies, within the plurality of semantic structures, of semantic classes representing individual words of the word combination and frequencies of relationships between words comprised by the word combination; and
use the list of collocations to perform a natural language processing operation.

11. The system of claim 10, wherein generating the raw list of word combinations comprises traversing a semantic structure of the plurality of semantic structures.

12. The system of claim 10, wherein generating the raw list of word combinations comprises determining values of a pre-defined statistic for each word combination comprised by the raw list of word combinations.

13. The system of claim 10, wherein applying the heuristic filter comprises replacing a word combination with a corresponding abstract collocation pattern.

14. The system of claim 10, wherein applying the heuristic filter comprises removing a word combination that is contained by another word combination referenced by the raw list of word combinations.

15. The system of claim 10, wherein applying the heuristic filter comprises removing a word combination that contains another word combination referenced by the raw list of word combinations.

16. The system of claim 10, wherein applying the heuristic filter comprises removing a word combination having a distance between words in a linear word order that exceeds a maximum distance threshold.

17. A computer-readable non-transitory storage medium comprising executable instructions that, when executed by a computing device, cause the computing device to perform operations comprising:
performing semantico-syntactic analysis of a natural language text to produce a plurality of semantic structures;
generating, in view of relationships defined by the semantic structures, a raw list of word combinations;
producing a list of collocations by applying a heuristic filter to the raw list of word combinations, wherein applying the heuristic filter comprises removing a word combination having a quality metric value falling below a quality metric threshold, wherein the quality metric is represented by a difference between an actual frequency and an expected frequency of the word combination, and wherein the expected frequency of a word combination is determined as a product of frequencies, within the plurality of semantic structures, of semantic classes representing individual words of the word combination and frequencies of relationships between words comprised by the word combination; and using the list of collocations to perform a natural language processing operation.

18. The computer-readable non-transitory storage medium of claim 17, wherein applying the heuristic filter comprises replacing a word combination with a corresponding abstract collocation pattern.

19. The computer-readable non-transitory storage medium of claim 17, wherein applying the heuristic filter comprises removing a word combination that contains another word combination referenced by the raw list of word combinations.

20. The computer-readable non-transitory storage medium of claim 17, wherein applying the heuristic filter comprises removing a word combination having a distance between words in a linear word order that exceeds a maximum distance threshold.

* * * * *